United States Patent
Ide et al.

(10) Patent No.: US 7,347,297 B2
(45) Date of Patent: Mar. 25, 2008

(54) APPARATUS FOR ACTIVATING OCCUPANT RESTRAINT DEVICE

(75) Inventors: Seiya Ide, Okazaki (JP); Yoshihisa Ogata, Chiryu (JP)

(73) Assignee: DENSO CORPORATION, Kariya (JP)

( * ) Notice: Subject to any disclaimer, the term of this patent is extended or adjusted under 35 U.S.C. 154(b) by 487 days.

(21) Appl. No.: 10/819,974

(22) Filed: Apr. 8, 2004

(65) Prior Publication Data

US 2004/0204810 A1     Oct. 14, 2004

(30) Foreign Application Priority Data

Apr. 10, 2003     (JP)     ............................. 2003-106818

(51) Int. Cl.
*B60K 28/014*     (2006.01)
(52) U.S. Cl. .................. 180/282; 701/45; 280/735; 307/10.1
(58) Field of Classification Search ................ 180/282; 307/10.1; 280/735; 701/45
See application file for complete search history.

(56) References Cited

U.S. PATENT DOCUMENTS

| 5,081,587 | A | * | 1/1992 | Okano ........................ 701/46 |
| 5,182,459 | A | * | 1/1993 | Okano et al. ............... 307/10.1 |
| 5,283,472 | A | * | 2/1994 | Takeuchi et al. ............ 307/10.1 |
| 5,285,187 | A | * | 2/1994 | Hirao et al. ................. 340/436 |
| 5,440,485 | A |   | 8/1995 | Okimoto et al. |
| 5,515,276 | A | * | 5/1996 | Kura et al. ................... 701/45 |
| 5,555,174 | A |   | 9/1996 | Okimoto et al. |
| 5,702,124 | A | * | 12/1997 | Foo et al. .................... 280/735 |
| 6,304,809 | B1 | * | 10/2001 | Cullen et al. ................. 701/93 |
| 6,305,709 | B1 | * | 10/2001 | Okada ......................... 280/735 |
| 6,311,112 | B1 | * | 10/2001 | Mazur et al. .................. 701/45 |
| 6,430,489 | B1 | * | 8/2002 | Dalum ......................... 701/45 |
| 6,460,882 | B1 | * | 10/2002 | Andres ....................... 280/735 |

FOREIGN PATENT DOCUMENTS

| JP | A-H05-330398 | 12/1993 |
| JP | A-H07-096816 | 4/1995 |
| JP | 9-222437 | 8/1997 |
| JP | A-2000-326822 | 11/2000 |

OTHER PUBLICATIONS

Foreign communication from Japanese Patent Office dated Mar. 23, 2007 for the corresponding Japanese patent application No. 2003-106818 (a copy and English translation thereof).

* cited by examiner

*Primary Examiner*—Paul N. Dickson
*Assistant Examiner*—Timothy D. Wilhelm
(74) *Attorney, Agent, or Firm*—Posz Law Group, PLC

(57) ABSTRACT

An apparatus for activating occupant restraint devices of a vehicle includes first and second sensors, first and second determination units, an output circuit, and an activation unit. The first sensor generates a first signal indicative of dynamic movement of the vehicle, and the first determination unit determines, using a CPU, whether or not to output a first activation signal depending on the first signal. The second sensor generates a second signal indicative of the dynamic movement of the vehicle, and the second determination unit determines, using two thresholds of deceleration and acceleration or a single selectively provided deceleration threshold, whether or not to output a second activation signal depending on the second signal. The output circuit outputs a final activation signal upon receiving both the first and second activation signals, and the activation unit activates the occupant restraint devices of the vehicle upon receiving the final activation signal.

2 Claims, 5 Drawing Sheets

APPARATUS FOR ACTIVATING OCCUPANT RESTRAINT DEVICE

BACKGROUND OF THE INVENTION

1 Technical Field of the Invention The present invention relates to an apparatus for activating occupant restraint devices of a vehicle.

2 Description of the Related Art

A conventional apparatus for activating occupant restraint devices of a vehicle has first and second acceleration sensors to detect deceleration of the vehicle.

Two output signals, which are generated by each of the first and second acceleration sensors of the vehicle, are fed to the same CPU of the vehicle. Then, the CPU determines whether or not to activate the occupant restraint devices of the vehicle such as an airbag, through two separate ways where each of the output signals of the first and second acceleration sensors of the vehicle are processed. As a result, the occupant restraint devices of the vehicle are activated upon receiving two activation signals from each of the two ways of determination. However, since both of the two output signals are processed by the single CPU, there is a possibility of faulty activation of the occupant restraint devices of the vehicle due to failure of the CPU.

To avoid faulty activations of the occupant restraint devices of the vehicle as described above, it can be considered to allow the apparatus to have two CPUs running in parallel. Thus, one CPU determines whether or not to activate the occupant restraint devices of the vehicle depending solely on the output signal of the first acceleration sensor of the vehicle, while the other executes the identical determination process depending solely on that of the second acceleration sensor of the vehicle.

However, the use of more than one CPU makes the apparatus expensive. As an alternative cost-effective solution, as proposed by Japanese Patent Application Laid-Open No. Hei 9-222437, the determination depending solely on the output signal of the first acceleration sensor is executed by using a CPU, whereas the determination depending solely on the output signal of the second acceleration sensor of the vehicle is implemented by using a relatively low-cost comparator instead of a CPU. The comparator is so configured to provide a signal to activate the occupant restraint devices of the vehicle when the output signal of the second acceleration sensor indicative of deceleration of the vehicle exceeds a predetermined threshold.

On the other hand, a RTTF (i.e., Required Time To Fire) for a vehicle, which is a required time-interval between an occurrence of collision of the vehicle and the resultant deployment of occupant restraint devices of the vehicle, is desired to be short.

However, when determining whether or not to activate the occupant restraint devices of the vehicle depending on the output signal of the second acceleration sensor of the vehicle by means of a comparator, an activation signal from the comparator cannot be outputted by a predetermined RTTF for the vehicle if there is a deviation of zero-point value for the second acceleration sensor of the vehicle. The deviation of zero-point value of the second acceleration sensor of the vehicle may be caused by, for example, aged deterioration of the sensor or a change in environmental temperature.

For example, there is an output signal of the second acceleration sensor of the vehicle as shown in FIG. 3, which is generated immediately after a collision of the vehicle. The output signal of the second acceleration sensor indicates a change in deceleration (as well as acceleration) of the vehicle with respect to time. In addition, the RTTF for the vehicle is predetermined as 26 msec.

First, suppose that the zero-point value of the second acceleration sensor coincides with a reference zero-point value thereof, and a threshold of deceleration for the comparator is predetermined as 70 m/s$^2$. Then, in FIG. 3, when the output signal of the second acceleration sensor goes above the solid horizontal threshold line which corresponds to the threshold of 70 m/s$^2$, the comparator outputs a signal to activate the occupant restraint devices of the vehicle.

Now, suppose that the zero-point value of the second acceleration sensor deviates, for example a value of 50 m/s$^2$, towards the negative direction of deceleration (i.e., the positive direction of acceleration) in FIG. 3. Then, the effect of the deviation is equivalent to that of a change where the output signal of the second acceleration sensor remains in the initial position, while the threshold for the comparator increases from 70 m/s$^2$ to 120 m/s$^2$. Referring to FIG. 3, there are a dashed horizontal line corresponding to the increased threshold of 120 m/s$^2$, and a solid vertical line representing the RTTF of 26 msec for the vehicle. It will be noted from FIG. 3 that the comparator cannot output a signal to activate the occupant restraint devices of the vehicle by the RTTF of 26 msec due to the deviation of zero-point value of the second acceleration sensor.

SUMMARY OF THE INVENTION

It is, therefore, an object of the present invention to provide a low-cost apparatus for activating occupant restraint devices of a vehicle, which can reliably output a signal to activate the occupant restraint devices of the vehicle depending on the output signal of a second acceleration sensor of the vehicle even when there is a deviation of zero-point value for the second acceleration sensor of the vehicle.

In accordance with one aspect of the invention, an apparatus for activating occupant restraint devices of a vehicle includes first and second sensors, first and second determination units, an output circuit, and an activation unit.

The first sensor of the apparatus senses dynamic movement of the vehicle and generates a first signal indicative of the dynamic movement of the vehicle, and the first determination unit determines, using a CPU, whether or not to output a first activation signal depending on the first signal from the first sensor. In the meanwhile, the second sensor senses dynamic movement of the vehicle and generates a second signal indicative of the dynamic movement of the vehicle, and the second determination unit determines, using low-cost comparators, whether or not to output a second activation signal depending on the second signal from the second sensor. The output circuit outputs a final activation signal upon receiving both the first activation signal from the first determination unit and the second activation signal from the second determination unit, and the activation unit activates the occupant restraint devices of the vehicle upon receiving the final activation signal from the output circuit.

Compared to a conventional apparatus which uses a single predetermined threshold of deceleration, the second sensor of the apparatus according to the present invention senses acceleration as well as deceleration of the vehicle, and the second determination unit of the apparatus executes the determination process by using a predetermined second threshold directed to the acceleration of the vehicle as well as a predetermined first threshold directed to the deceleration of the vehicle. As a result, the use of more than one threshold enables the apparatus to reliably output a second activation signal for activating the occupant restraint devices of the vehicle by the RTTF for the vehicle, even when there is a deviation of zero-point value for the second sensor of the apparatus.

According to another aspect of the invention, an apparatus for activating occupant restraint devices of a vehicle includes first and second sensors, first and second determination units, an output circuit, and an activation unit.

The first sensor senses deceleration of the vehicle and generates a first deceleration signal indicative of the deceleration of the vehicle, and the first determination unit determines, using a CPU, whether or not to output a first activation signal depending on the first deceleration signal from the first sensor. In the meanwhile, the second sensor senses the deceleration of the vehicle and generates a second deceleration signal indicative of the deceleration of the vehicle, and the second determination unit determines, using low-cost comparators, whether or not to output a second activation signal depending on the second deceleration signal from the second sensor. The output circuit outputs a final activation signal upon receiving both the first activation signal from the first determination unit and the second activation signal from the second determination unit, and the activation unit activates the occupant restraint devices of the vehicle upon receiving the final activation signal from the output circuit.

Compared to a conventional apparatus which uses a single predetermined threshold of deceleration, the second determination unit of the apparatus according to the present invention includes a threshold provider for selectively providing a deceleration threshold for the determination depending on the second deceleration signal from the second sensor of the apparatus. The threshold provider consists preferably of a threshold setting means for setting a plurality of deceleration thresholds, and a threshold selection means for selecting one deceleration threshold from the plurality of deceleration thresholds set by the threshold setting means depending on the second deceleration signal from the second sensor. As a result, the use of selectively provided deceleration threshold enables the apparatus to reliably output a second activation signal for activating the occupant restraint devices of the vehicle by the RTTF for the vehicle, even when there is a deviation of zero-point value for the second sensor of the apparatus.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings.

DESCRIPTION OF THE PREFERRED EMBODIMENTS

First Embodiment

An apparatus for activating occupant restraint devices of a vehicle according to a first embodiment of the present invention is described with reference to FIG. 1.

Figure 1:
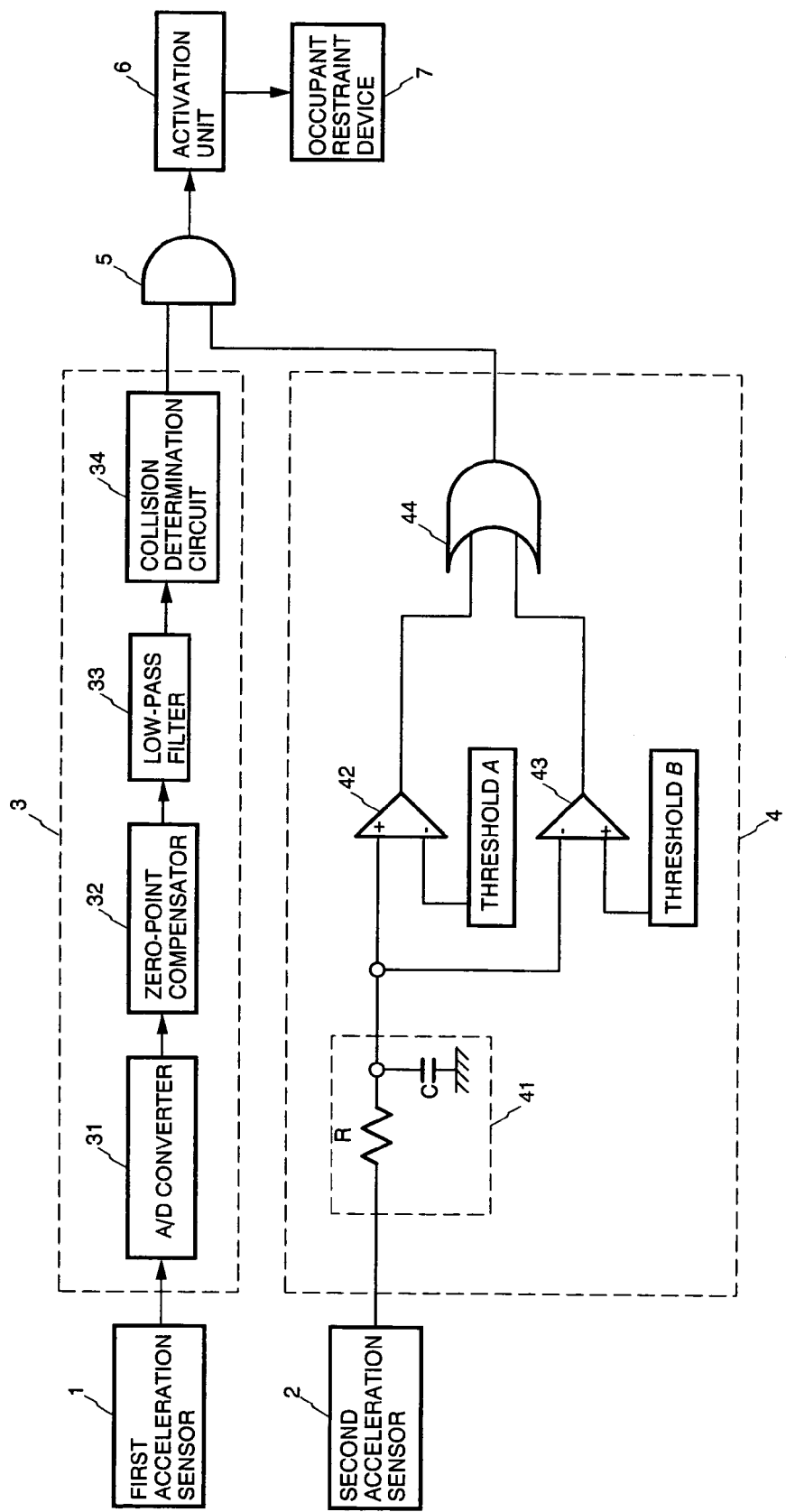
FIG. 1 is a block diagram illustrating an apparatus for activating occupant restraint devices of a vehicle according to the first embodiment of the invention.

As shown in FIG. 1, the apparatus is provided with a first acceleration sensor 1, a second acceleration sensor 2, a first determination unit 3, a second determination unit 4, an AND gate 5, and an activation unit 6 which is further connected to occupant restraint device 7. The occupant restraint device 7 hereof represents one or more occupant restraint devices of the vehicle such as an airbag. The apparatus is mounted in the central portion of the body of the vehicle.

The first acceleration sensor 1 is an electronic sensor to detect deceleration (i.e., negative acceleration) of the vehicle. The first acceleration sensor 1 outputs a signal indicative of deceleration of the vehicle which is an analog electric voltage signal corresponding to the displacement of the vehicle.

As mentioned previously, a conventional second acceleration sensor of a vehicle only detects deceleration of the vehicle. However, the second acceleration sensor 2 according to the present embodiment, which is also an electronic sensor, detects not only deceleration but also acceleration of the vehicle. Accordingly, the first and second acceleration sensors 1 and 2 of the vehicle have different output voltage ranges.

The first determination unit 3, which consists of a microcomputer, includes an A/D converter 31, a zero-point compensator 32, a first LPF (Low-Pass Filter) 33 for shaping wave form, and a collision determination circuit 34. The first determination unit 3 determines whether to activate the occupant restraint device 7 depending on the output signal of the first acceleration sensor 1.

The A/D converter 31 is connected with the first acceleration sensor 1, so that the output signal of the first acceleration sensor 31 is fed to the A/D converter 31 and converted to a corresponding digital signal representing deceleration of the vehicle.

The zero-point compensator 32 determines deviation of zero-point value for the first acceleration sensor 1 based on the output signal thereof, which is digitized by the A/D converter 31, and if deviation exists, compensates for it.

The first LPF 33 cuts off noise involved in the output signal of the zero-point compensator 32, thereby shaping the wave form of the output signal.

The collision determination circuit 34 integrates the output signal of the first LPF 33, detecting an occurrence of collision of the vehicle based on the integration results, and determines whether to output a first activation signal for activating the occupant restraint device 7 when an occurrence of collision of the vehicle is detected.

The second determination unit 4 includes a second LPF 41, a deceleration comparator 42 which compares deceleration of the vehicle with a predetermined deceleration threshold, an acceleration comparator 43 which compares acceleration of the vehicle with a predetermined acceleration threshold, and an OR gate 44. The second determination unit 4 determines whether to output a second activation signal for activating the occupant restraint device 7 depending on the output signal of the second acceleration sensor 2.

The second LPF 41 of the second determination unit 4 cuts off noise involved in the output signal of the second acceleration sensor 2, thereby shaping the wave form of the output signal. The second LPF 41 includes a resistor R and a capacitor C, and the time constant thereof is a necessary parameter for determining whether a collision of the vehicle has occurred. In addition, the cut-off frequency of the second LPF 41 may, for example, be 200 Hz.

The deceleration comparator 42 has its positive input terminal (+) through which the output signal of the second LPF 41 is inputted, and its negative input terminal (−) through which a voltage signal representing a deceleration threshold A is inputted. On the other hand, the acceleration comparator 43 has its positive input terminal (+) through which a voltage signal representing an acceleration threshold B is inputted, and its negative input terminal (−) through which the output signal of the second LPF 41 is inputted.

Figure 2:
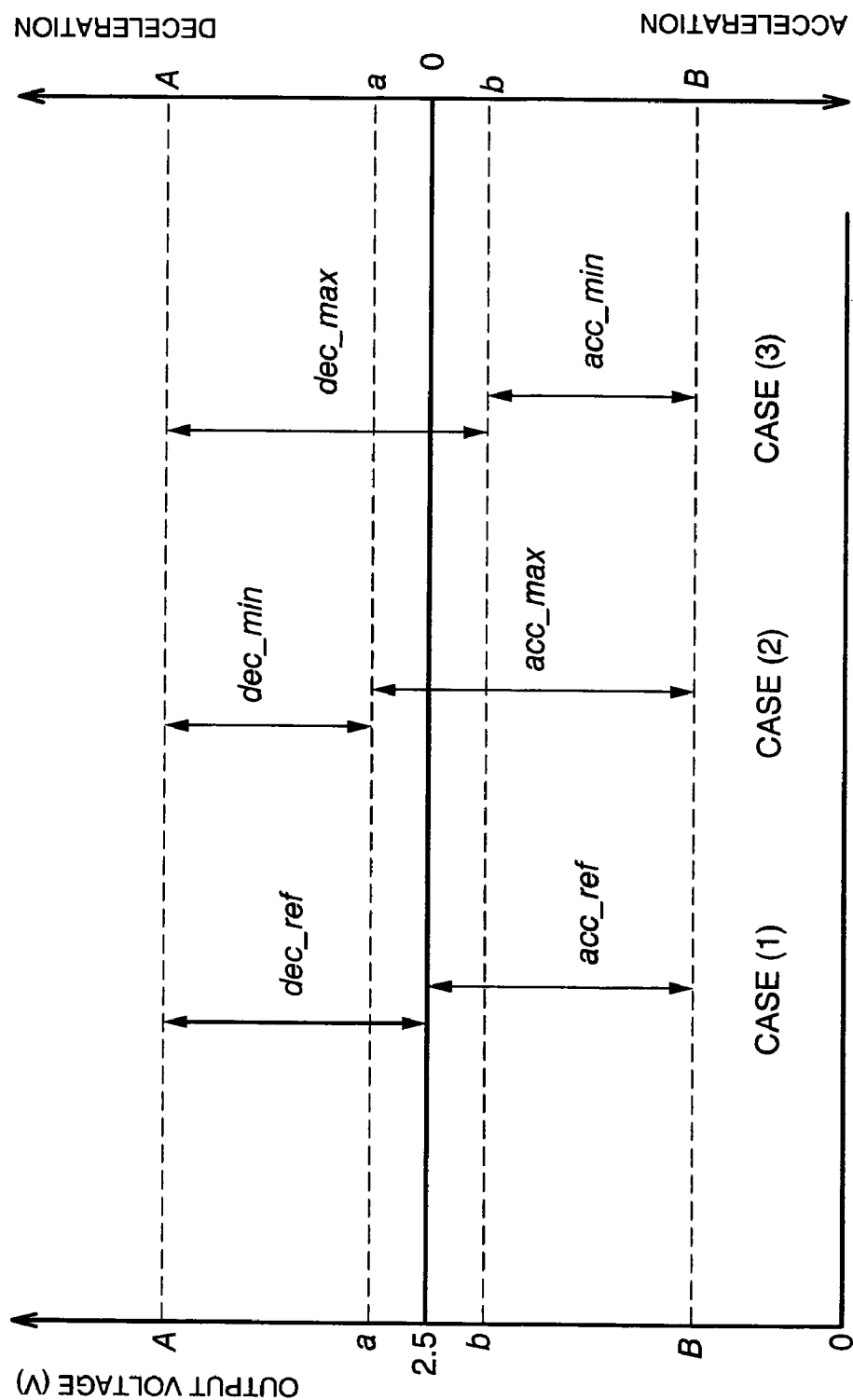
FIG. 2 is a diagram illustrating a relationship between deviation of zero-point value of the second acceleration sensor 2 of FIG. 1 and thresholds of deceleration and acceleration for the comparators 42, 43 of FIG. 1 according to the first embodiment of the invention.

Referring to FIG. 2, a relationship between deviation of zero-point value of the second acceleration sensor 2 and the thresholds A and B for the comparators 42 and 43 is described. There are two vertical axes in FIG. 2, the left one is used to indicate value of voltage of the output signal of the second LPF 41 while the right one is used to indicate value of deceleration (as well as acceleration) of the vehicle. In addition, the upward direction of the right vertical axis corresponds to the positive direction of deceleration while the downward direction of that corresponds to the positive direction of acceleration.

A zero-point value of the second acceleration sensor 2 is a value of voltage which is indicated on the left vertical axis in FIG. 2 when both actual values of deceleration and acceleration of the vehicle indicated on the right vertical axis are zero. In addition, there is a reference zero-point value given to the second acceleration sensor 2, which is pre-defined as 2.5 V in FIG. 2. Zero-point value of the second acceleration sensor 2 may deviate from the reference zero-point value of 2.5 V due to the previously mentioned causes.

The deceleration threshold A for the comparator 42 has a voltage value greater than the reference zero-point value of 2.5 V, whereas the acceleration threshold B for the comparator 43 has a voltage value in the range of from 0 to 2.5 V. Accordingly, in FIG. 2, the dashed line A-A above the central horizontal axis corresponds to the deceleration threshold A, whereas the dashed line B-B below the central horizontal axis corresponds to the acceleration threshold B.

When the output signal of the second LPF 41 goes above the dashed line A-A in FIG. 2, in other words, the voltage value of the output signal of the second LPF41 exceeds that of the deceleration threshold A, the deceleration comparator 42 outputs an ON signal, otherwise, it does not. On the other hand, when the output signal of the second LPF 41 goes below the dashed line B-B, in other words, the voltage value of the output signal of the second LPF41 drops below that of the acceleration threshold B, the acceleration comparator 43 outputs an ON signal, otherwise, it does not.

Referring again to FIG. 1, when either of the deceleration comparator 42 or the acceleration comparator 43 outputs an ON signal, the OR gate 44 outputs a second activation signal for activating the occupant restraint device 7 of the vehicle. More specifically, when the voltage value of the output signal of the second LPF41 exceeds that of the deceleration threshold A or drops below that of the acceleration threshold B, either the deceleration comparator 42 or the acceleration comparator 43 outputs an ON signal, thereby outputting a second activation signal.

The AND gate 5 outputs a final activation signal for activating the occupant restraint device 7 of the vehicle upon receiving both a first activation signal from the first determination unit 3 and a second activation signal from the second determination unit 4.

The activation unit 6, which may be a squib, activates the occupant restraint device 7 of the vehicle upon receiving a final activation signal from the AND gate 5.

The main advantage of configuring the second determination unit 4 as described above is described with reference to FIGS. 2 and 3.

As mentioned previously, the left vertical axis in FIG. 2 indicates the value of voltage of the output signal of the second LPF41, and the right vertical axis indicates the value of deceleration (as well as acceleration) of the vehicle. The central horizontal axis in FIG. 2 corresponds to the condition of the second acceleration 2 where there is no deviation of zero-point value for the sensor, that is, zero-point value of the sensor is equal to the reference zero-point value of 2.5 V. In addition, there is a dashed line a-a above the central horizontal axis, which corresponds to a condition of the sensor where there is a deviation of zero-point value for the sensor towards the positive direction of deceleration, that is, the zero-point value of the sensor is a V greater than the reference zero-point value of 2.5 V. On the contrary, the dashed line b-b below the central horizontal axis corresponds to a condition of the sensor where there is a deviation of zero-point value for the sensor towards the positive direction of acceleration, that is, the zero-point value of the sensor is b V smaller than the reference zero-point value of 2.5 V.

For ease of description, suppose that the voltage difference of dec_ref between the reference zero-point value of 2.5 V and the deceleration threshold A is equal to that of acc_ref between 2.5 V and the acceleration threshold B, as the case (1) in FIG. 2. The deceleration of the vehicle corresponding to dec_ref is referred to as reference-deceleration of the vehicle, and when deceleration of the vehicle exceeds it, an ON signal for activating the occupant restraint device 7 is outputted by the comparator 42. On the other hand, the value of acceleration of the vehicle corresponding to acc_ref is referred to as reference-acceleration of the vehicle, and when acceleration of the vehicle exceeds it, an ON signal for activating the occupant restraint device 7 is also outputted by the comparator 43.

When the zero-point value of the second acceleration sensor 2 deviates from 2.5 V to a V, as the case (2) in FIG. 2, the voltage difference of dec_min between the deceleration threshold A and a is less than that of acc_max between a and the acceleration threshold B. In addition, the voltage difference of dec_min is less than dec_ref, in other words, even when the actual deceleration of the vehicle does not exceed the reference-deceleration of the vehicle but exceeds a deceleration corresponding to the voltage difference of (A−a), an ON signal for activating the occupant restraint device 7 of the vehicle can be outputted by the comparator 42.

On the contrary, when the zero-point value of the second acceleration sensor 2 deviates from 2.5 V to b V, as the case (3) in FIG. 2, the voltage difference of dec_max between the deceleration threshold A and b is greater than that of acc_min between b and the acceleration threshold B. In addition, the voltage difference of dec_max is greater than that of dec_ref, in other words, when the actual deceleration of the vehicle exceeds the reference-deceleration of the vehicle but does not exceed a deceleration corresponding to the voltage difference of (A−b), no ON signal for activating the occupant restraint device 7 is outputted by the comparator 42. However, at the same time, the voltage difference of acc_min is less than that of acc_ref, in other words, even when the actual acceleration of the vehicle does not exceed the reference-acceleration of the vehicle but exceeds an acceleration corresponding to the voltage difference of (b−B), an ON signal can be outputted by the comparator 43.

Figure 3:
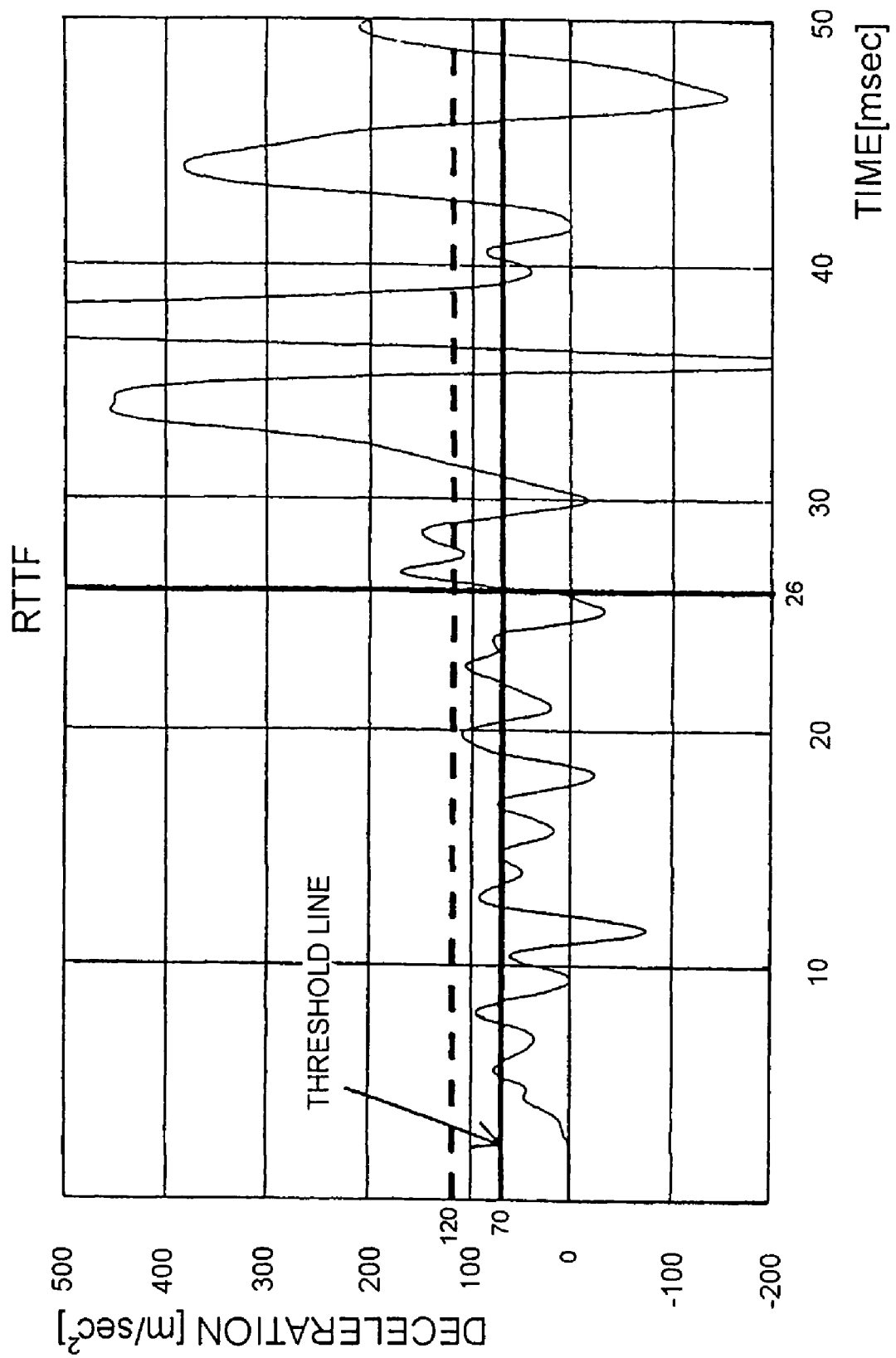
FIG. 3 is a timing chart illustrating an output signal of the second LPF 41 of FIG. 1 according to the first embodiment of the invention.

More specifically, in FIG. 3, there is an output signal of the second acceleration sensor 2 of the vehicle described previously, and both values of the deceleration threshold A and acceleration threshold B are predetermined as 70 m/s$^2$.

First, suppose that there is no deviation of zero-point value for the second acceleration sensor 2, which corresponds to the case (1) in FIG. 2. Then, the deceleration of the vehicle represented by the output signal of the second acceleration sensor 2 exceeds the threshold A of 70 m/s$^2$ at the time of 6 msec, whereas the acceleration of the vehicle represented by the same signal exceeds the threshold B of 70 M/s$^2$ at the time of 12 msec. As a result, a second activation signal for activating the occupant restraint device 7 of the vehicle is outputted through the OR gate at the time of 6 msec, which is shorter than the predetermined RTTF of 26 msec for the vehicle.

Secondly, suppose that the zero-point value of the second acceleration sensor 2 deviates, for example a value of 50 m/s$^2$, towards the positive direction of deceleration of the vehicle, which corresponds to the case (2) in FIG. 2. Then, the effect of the deviation is equivalent to that of a change where the output signal of the second acceleration sensor 2 remains in the initial position in FIG. 3, while the deceleration threshold A and the acceleration threshold B become 20 m/s$^2$ and −120 m/s$^2$ respectively. Consequently, the deceleration of the vehicle represented by the output signal of the second acceleration sensor 2 exceeds the threshold A of 20 M/s$^2$ at the time of 4 msec, whereas the acceleration of the vehicle represented by the same signal exceeds the threshold B of −120 m/s$^2$ at the time of 36 msec. As a result, a second activation signal for activating the occupant restraint device 7 of the vehicle is outputted through the OR gate 44 at the time of 4 msec, which is shorter than the predetermined RTTF of 26 msec for the vehicle.

Finally, suppose that the zero-point value of the second acceleration sensor 2 deviates, for example a value of 50 m/s$^2$, towards the negative direction of deceleration (i.e., the positive direction of acceleration) of the vehicle, which corresponds to the case (3) in FIG. 2. Then, the effect of the deviation is equivalent to that of a change where the output signal of the second acceleration sensor 2 remains in the initial position in FIG. 3, while the deceleration threshold A and the acceleration threshold B become 120 m/s$^2$ and −20 m/s$^2$ respectively. Consequently, the deceleration of the vehicle represented by the output signal of the second acceleration sensor 2 exceeds the threshold A of 120 m/s$^2$ at the time of 27 msec, whereas the acceleration of the vehicle represented by the same signal exceeds the threshold B of −20 m/s$^2$ at the time of 11 msec. As a result, a second activation signal for activating the occupant restraint device 7 of the vehicle is outputted through the OR gate 44 at the time of 11 msec, which is shorter than the predetermined RTTF of 26 msec for the vehicle.

Accordingly, the second determination unit 4 according to the present embodiment can reliably output a second activation signal for activating the occupant restraint device 7 of the vehicle by the RTTF for the vehicle, even when there is a deviation of zero-point value for the second acceleration sensor 2.

In addition, acceleration of a vehicle rising immediately after a collision of the vehicle is generally smaller than deceleration of the vehicle rising. Therefore, the voltage difference of acc_ref between 2.5 V and the acceleration threshold B may preferably be set smaller than that of dec_ref between the reference zero-point value of 2.5 V and the deceleration threshold A, so that the second determination unit 4 can even reliably output a second activation signal for activating the occupant restraint device 7 of the vehicle.

Second Embodiment

An apparatus for activating occupant restraint devices of a vehicle according to a second embodiment of the present invention is described with reference to FIG. 4.

Figure 4:
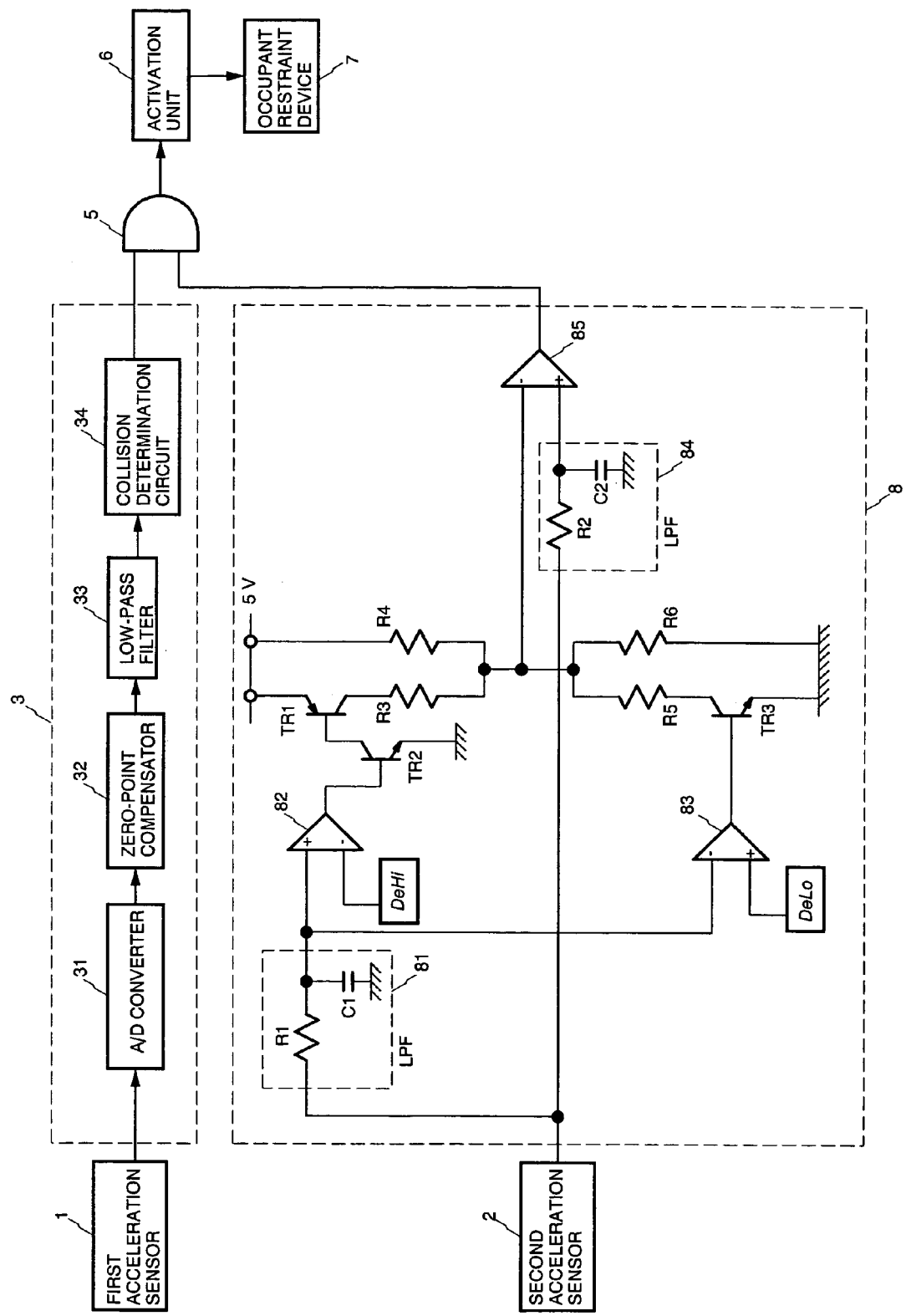
FIG. 4 is a block diagram illustrating an apparatus for activating occupant restraint devices of a vehicle according to the second embodiment of the invention.

As shown in FIG. 4, the apparatus is provided with a first acceleration sensor 1, a second acceleration sensor 2, a first determination unit 3, a second determination unit 8, an AND gate 5, and an activation unit 6 which is further connected to occupant restraint device 7. The occupant restraint device 7 hereof represents one or more occupant restraint devices of the vehicle such as an airbag. The apparatus is mounted in the central portion of the body of the vehicle.

It is necessary to note first that the second acceleration sensor 2 of the apparatus only detects deceleration of the vehicle, which is different from the case of the first embodiment of the invention where a second acceleration sensor 2 detects not only deceleration but also acceleration of the vehicle. Other functional blocks of the apparatus denoted with the same numerals as those of the apparatus according to the first embodiment of the invention are not described repeatedly in the interest of brevity.

Referring to FIG. 4, the second determination unit 8 of the apparatus includes a second LPF 81, a first comparator 82, a second comparator 83, a third LPF 84, a third comparator 85, transistors TR1, TR2, and TR3, and resistors R3, R4, R5, and R6. The second determination unit 8 determines whether to output a second activation signal for activating the occupant restraint device 7 of the vehicle depending on the output signal of the second acceleration sensor 2.

The second LPF 81 of the second determination unit 8 is a LPF for providing a signal for determining deviation of zero-point value for the second acceleration sensor 2. The second LPF81 includes a resistor R1 and a capacitor C1, and the time constant thereof is considerably greater than that of the third LPF 84 of the apparatus to be described below. In addition, the cut-off frequency of the second LPF 81 may, for example, be 0.05 Hz.

By the way, in the second embodiment, the first and second comparators 82 and 83, the transistors TR1, TR2 and TR3, and resistors R3, R4, R5, and R6 constitute a threshold provider of the second determination unit 8 for selectively providing a deceleration threshold for the determination depending on the output signal of the second acceleration sensor 2. More specifically, the first and second comparators 82 and 83, together with the transistors TR1, TR2, and TR3, provide a threshold selection means for the third comparator 85, while the resistors R3, R4, R5, and R6 provide a threshold setting means for the same comparator.

The first comparator 82 has its positive input terminal (+) through which the output signal of the second LPF 81 is inputted, and its negative input terminal (−) through which a voltage signal representing an upper threshold DeHi for determining deviation of zero-point value for the second acceleration sensor 2 is inputted. The upper threshold DeHi has a greater voltage value than a reference zero-point value DeRef of the second acceleration sensor 2. The reference zero-point value DeRef of the sensor is a zero-point value of the sensor in the initial condition thereof, in other words, is an ideal zero-point value of the sensor. When the voltage value of the output signal of the second LPF 81 exceeds the upper threshold DeHi, the first comparator 82 outputs an ON signal, otherwise, it does not.

The transistor TR1 is a PNP transistor having its emitter connected to a power supply bus of 5 V coupled to a battery (the battery is omitted from FIG. 4), its base connected to the collector of the transistor TR2, and its collector connected to the resistor R3. The transistor TR2 is a NPN transistor having its collector connected to the base of the transistor TR1, its base connected to the output terminal of the first comparator 82, and its emitter connected to ground. Accordingly, when an ON signal is outputted from the first comparator 82, the transistor 82 is biased on, thereby biasing the transistor TR1 on. As a result, current flows through the emitter-collector circuit of the transistor TR1.

The second comparator 83 has its positive input terminal (+) through which a voltage signal representing a lower threshold DeLo for determining deviation of zero-point value for the second acceleration sensor 2 is inputted, and its negative input terminal (−) through which the output signal of the second LPF 81 is inputted. The lower threshold DeLo has a smaller voltage value than the reference zero-point value DeRef of the sensor. When the voltage value of the output signal of the second LPF 81 drops below the lower threshold DeLo, the second comparator 83 outputs an ON signal, otherwise, it does not.

The transistor TR3 is a NPN transistor having its collector connected to the resistor 5, its base connected to the output terminal of the second comparator 83, and its emitter connected to ground. Accordingly, when an ON signal is outputted from the second comparator 83, the transistor TR3 is biased on.

The resistors R3, R4, R5, and R6 constitute a means for setting thresholds including a reference threshold, an upper threshold, and lower threshold for the third comparator 85 to be described below.

As seen from FIG. 4, the resistors R3 and R4 are connected in parallel, and the resistors R5 and R6 are connected in parallel as well. In addition, the combined resistors R3, R4 are connected in series with the combined resistors R5 and R6. More specifically, the resistor R3 has its high voltage end connected to the collector of the transistor TR1, and its low voltage end connected to the low voltage end of the resistor R4, that is, the common high voltage end of the resistors R5 and R6. The resistor R4 has its high voltage end connected to the power supply bus of 5 V, and its low voltage end connected to the low voltage end of the resister R3. The low voltage end of the resistor R5 is connected to the collector of the transistor TR3, and the low voltage end of the resistor R6 is connected to ground.

The third LPF 84 of the second determination unit 8 cuts off noise involved in the output signal of the second acceleration sensor 2, thereby shaping the wave form of the output signal. The third LPF 84 includes a resistor R2 and a capacitor C2, and the time constant thereof is a necessary parameter for determining whether a collision of the vehicle has occurred. In addition, the cut-off frequency of the third LPF 84 may, for example, be 200 Hz.

The third comparator 85 of the second determination unit 8 has its positive input terminal (+) through which the output signal of the third LPF 84 is inputted, and its negative input terminal (−) with which the common low voltage end of the resistors R3 and R4, that is, the common high voltage end of the resistors R5 and R6 is connected. In addition, the output signal of the third comparator 85 is provided to the OR gate 5.

Figure 5:
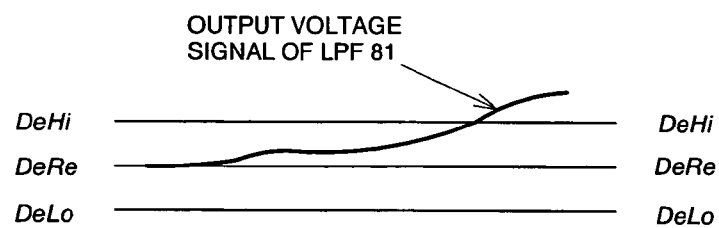
FIG. 5 is a simplified view illustrating an output signal of the second LPF 81 of FIG. 4 according to the second embodiment of the invention.
Figure 6:
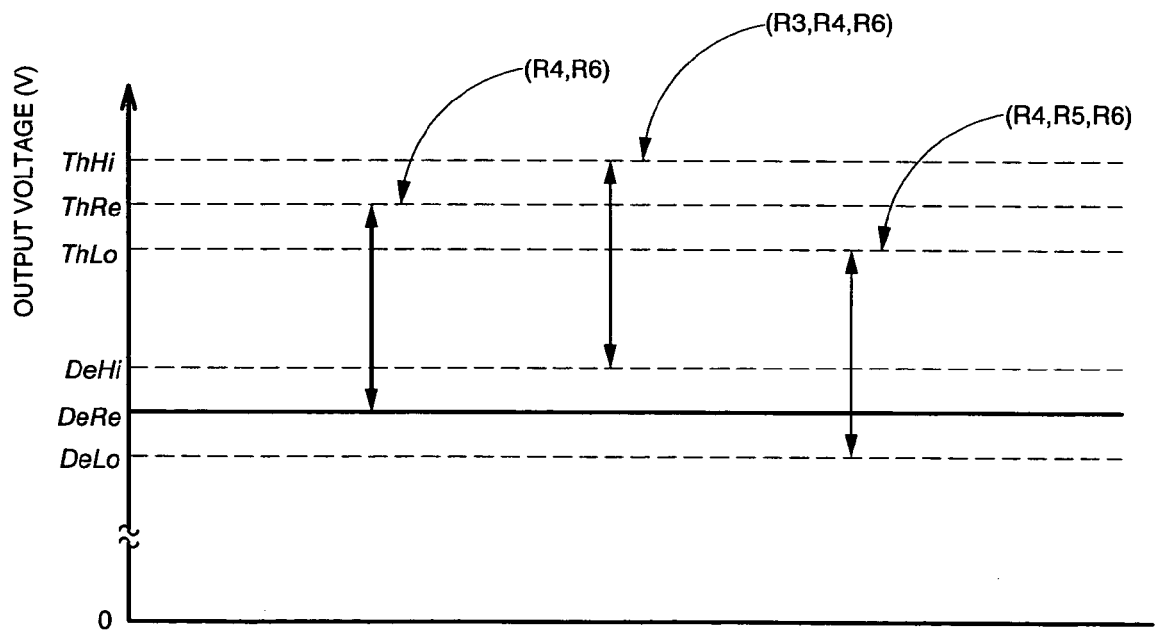
FIG. 6 is a diagram illustrating a relationship between deviation of zero-point value of the second acceleration sensor 2 of FIG. 4 and deceleration threshold for the comparators 85 of FIG. 4 according to the second embodiment of the invention.

The determination process of the second determination unit 8 is described with reference to FIGS. 4-6. FIG. 5 shows an output signal of the second LPF 81 with three horizontal lines DeHi-DeHi, DeRe-DeRe, and DeLo-DeLo. FIG. 6 illustrates a relationship between thresholds for determining deviation of zero-point value for the second acceleration sensor 2 and deceleration thresholds for the third comparators 85.

First, in FIG. 5, when the output signal of the second LPF 81 lies on the area between the threshold lines DeHi-DeHi and DeLo-DeLo for determining deviation of zero-point value for the second acceleration sensor 2, no ON signal is outputted from either of the comparators 82 and 83. Then, the Transistors TR1, TR2, and TR3 are not biased on, consequently no current flows through the resistors R3 and R5. As a result, the voltage, which is determined by the voltage divider consisting of the resistors R4 and R6, is applied to the negative terminal (−) of the third comparator 85. In addition, the voltage determined by the resistors R4 and R5 is referred to as the reference threshold ThRe for the third comparator 85.

Secondly, in FIG. 5, when the output signal of the second LPF 81 goes above the threshold line DeHi-DeHi, the first comparator 82 outputs an ON signal while the second comparator 83 does not. Then, the transistors TR1 and TR2 are biased on in turn while the transistor TR3 is not, consequently current flows through the resistors R3, R4, and R6 while there is no current flowing through the resistor R5. As a result, the voltage, which is determined by the voltage divider consisting of the resistors R3, R4, and R6, is applied to the negative terminal (−) of the third comparator 85. Since the combined resistance of the resistors R3 and R4 in parallel is smaller than the resistance of the single resistor R4, the voltage determined is higher than the reference threshold ThRe for the third comparator 85, and is accordingly referred to as high threshold ThHi therefore. In FIG. 6, the high threshold ThHi for the comparator 85 is corresponding to the upper threshold DeHi for determining deviation of zero-point value for the second acceleration sensor 2.

Finally, in FIG. 5, when the output signal of the second LPF 81 goes below the threshold line DeLo-DeLo, the second comparator 83 outputs an ON signal while the first comparator 82 does not. Then, the transistor TR3 is biased on while the transistors TR1 and TR2 are not, consequently current flows through the resistors R4, R5, and R6 while there is no current flowing through the resistor R3. As a result, the voltage, which is determined by the voltage divider consisting of the resistors R4, R5, and R6, is applied to the negative terminal (−) of the third comparator 85. Since the combined resistance of the resistors R5 and R6 in parallel is smaller than the resistance of the single resistor R6, the voltage determined is lower than the reference threshold ThRe for the third comparator 85, and is accordingly referred to as low threshold ThLo. In FIG. 6, the low threshold ThLo for the third comparator 85 is corresponding to the Lower threshold DeLo for determining deviation of zero-point value for the second acceleration sensor 2.

Accordingly, even when there is a deviation of zero-point value for the second acceleration sensor 2, an optimal threshold is selectively provided, so that a second activation signal can reliably be outputted from the second determination unit 8.

While the above particular embodiments of the invention have been shown and described, it will be understood by those who practice the invention and those skilled in the art that various modifications, changes, and improvements may be made to the invention without departing from the spirit of the disclosed concept. Such modifications, changes, and improvements within the skill of the art are intended to be covered by the appended claims.

What is claimed is:

1. An apparatus for activating an occupant restraint device of a vehicle, said apparatus comprising:
    a first sensor for sensing deceleration of the vehicle and generating a first signal indicative of the sensed deceleration of the vehicle;
    a second sensor for sensing dynamic movement of the vehicle and generating a second signal indicative of the sensed dynamic movement of the vehicle, the dynamic movement of the vehicle including acceleration and the deceleration of the vehicle;
    a first determination unit determining whether or not to output a first activation signal depending on the first signal from said first sensor;
    a second determination unit determining, using a predetermined threshold, whether or not to output a second activation signal depending on the second signal from said second sensor, said predetermined threshold comprising a first threshold directed to the deceleration of the vehicle and a second threshold directed to the acceleration of the vehicle;
    an output circuit outputting a final activation signal upon receiving both the first activation signal from said first determination unit and the second activation signal from said second determination unit; and
    an activation unit activating the occupant restraint device of the vehicle upon receiving the final activation signal from said output circuit,
    wherein said second sensor is given a reference zero-point value, wherein an absolute value of the difference between the reference zero-point value and the first threshold is smaller than an absolute value of the difference between the reference zero-point value and the second threshold.

2. The apparatus as set forth in claim 1, wherein said second determination unit comprises:
    a first comparator for comparing the second signal from said second sensor with the first threshold directed to the deceleration or the vehicle and outputting the second activation signal when the second signal from said second sensor exceeds the first threshold; and
    a second comparator for comparing the second signal from said second sensor with the second threshold directed to the acceleration of the vehicle and outputting the second activation signal when the second signal from said second sensor exceeds the acceleration threshold.

* * * * *